Jan. 26, 1960     R. L. BEURLE     2,922,922
ELECTRON OPTICAL DEVICES

Filed May 10, 1957     2 Sheets-Sheet 1

INVENTOR
Raymond Louis Beurle
BY
Stevens, Davis, Miller & Mosher
ATTORNEYS

United States Patent Office 2,922,922
Patented Jan. 26, 1960

2,922,922
ELECTRON OPTICAL DEVICES

Raymond Louis Beurle, London, England, assignor to National Research Development Corporation, London, England Application May 10, 1957, Serial No. 658,396

Claims priority, application Great Britain May 12, 1956

12 Claims. (Cl. 315—11)

This invention relates to electron optical devices such as electron image multipliers, image intensifiers, image converters, image storage tubes and some types of television tubes in which an electron image is established. In known devices of this type, the electrons are usually accelerated by static potentials on the various electrodes.

The object of the present invention is to provide new and improved electron optical devices in which a periodically varying potential is applied to one or more of the electrodes thereof and the electron image is intensified by secondary emission.

According to the present invention, an electron optical device comprises an electron emissive surface, means for establishing an electron image at the said surface, a first electrode spaced from the said surface for connection to a first voltage source, a second electrode spaced from the first electrode for connection to a second voltage source and means for providing an electron image focusing field extending in the direction of spacing of the said surface and the first and second electrodes, the potential of the first voltage source being positive with respect to the said surface and the potential of one of the voltage sources varying periodically, whereby electrons emitted from the said surface are accelerated away from the said surface so as to pass the first electrode and are then returned to the said surface by a potential difference between the first and second electrodes so as to strike the said surface and to liberate secondary electrons therefrom substantially reproducing the said electron image.

According to one form of the invention, the first voltage source is a generator of positive-going pulses. Such pulses may start from zero potential or a low positive potential with respect to the said surface depending upon the required mode of operation of the device.

Alternatively, an alternating voltage generator may be used instead of a pulse generator.

According to another form of the invention, the first electrode may be maintained at a fixed potential positive with respect to the said surface and an alternating voltage generator may be connected between the first and second electrodes.

Conveniently, the said surface may be a photo-cathode and, in a particular application, may be the photo-cathode of a television tube.

It will be shown that in any electron optical device according to the present invention, the arrangement of the parts thereof is such that by the application of a periodically varying potential energy is imparted to electrons forming an electron image. This effect may be used in various alternative ways to multiply or strengthen an optical image or a charge image or to make an optical image or a charge image more visible or more easily detectable or less subject to interference. Similar means may be used to increase the energy of any beam or group of electrons, or of individual electrons, by which information about an image or other information is carried in the configuration of the electrons or in their position relative to each other or relative to some reference point. This energy may be used to multiply the beam or group of electrons or individual electrons, and by this or other means the energy may be used to render the information carried by the electrons more readily accessible.

In order that the invention may be readily carried into effect, the principle thereof will be explained and several embodiments will be described in detail, by way of example, with reference to the accompanying drawings, of which:

Introduction

Figure 1:
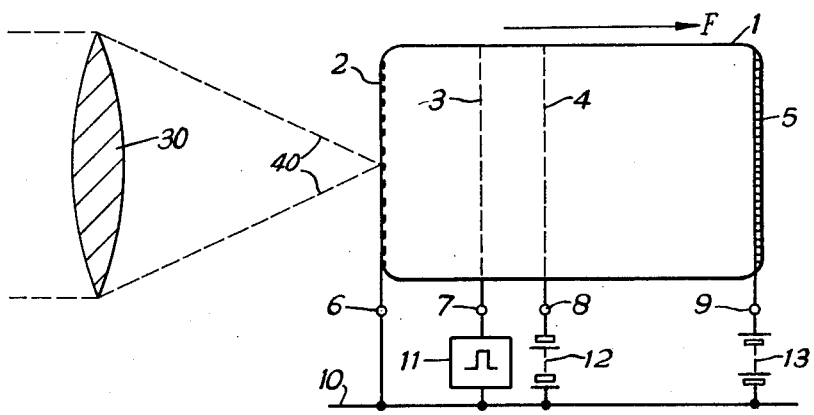
Figure 1 is a diagrammatic representation of an image multiplier illustrating the principle of the invention and showing one embodiment thereof.

A device for intensifying weak light images is useful for many purposes, and image intensifiers of various forms already exist. One method of image intensification is to employ secondary emission electron multiplication. In common with certain other methods it involves the use of a photo-cathode to convert the optical image into a focused electron stream. Then, instead of using this primary electron beam directly to form a second optical image, the beam is first enhanced by means of secondary emission. This may be done by means of static potentials on dynodes which are shaped so as to prevent the electrons from individual elements of the image diffusing among one another. Such a method has already been proposed.

An alternative principle is to enhance the beam by accelerating the electrons by means of varying potentials on appropriate electrodes so that they bombard a suitable secondary emitting surface. This releases a stream of secondary electrons which may be focused on to a fluorescent screen to give an intensified optical image. If necessary, the process may be repeated a number of times before the secondary electron stream is accelerated on to a fluorescent screen. This further intensifies the optical image which is finally produced.

The principle may, of course, be applied to any focused electron stream, whether or not it originates at a photo-cathode. Similarly, the enhanced electron stream may be used to form an optical image on a fluorescent screen or a charge image on a storage plate or a latent, developable image on a photographic plate, or other plate sensitive to bombardment by electrons, or for any other purpose.

A variation of this same principle may be used to strengthen a charge image which has been formed on a storage surface by the departure of photo-electrons or secondary electrons. To strengthen a charge image of this sort, electrons which have just left the storage surface are constrained to return to the point which they have left, with sufficient energy to emit several more electrons which are then removed. Thus, for each positive charge left on the storage plate by emission of the original electrons, there will ultimately be a positive charge several times as great left at the same point due to the secondary emission. This process may also be repeated several times.

It is with the possibilities of dynamic secondary emission electron multipliers, that is electron optical devices to which a periodically varying potential is applied, that the present invention is concerned.

It should be emphasised that the purpose of the varying potential between the appropriate electrodes is to impart the required energy to certain electrons in the device. This is quite distinct from the variation of potential on the electrodes of image converters and similar devices with the aim of switching the device or part of the device on and off or with the aim of altering its sensitivity.

*Advantages of using varying potentials*

The main advantage of using varying potentials to accelerate the secondary electrons, is that a single secondary emitting surface can be used repeatedly during the process of enhancement. It also becomes practical to focus the stream of secondary electrons during the enhancement process, so as to avoid degradation of the final image.

The use of varying potentials is of particular importance with regard to the possibility of strengthening the charge image on a storage plate directly. Without the use of varying potentials this could not be made to work, for electrons could only return to the storage plate with the energy with which they left it, and this would be insufficient to give a secondary emission ratio greater than unity.

In the Farnsworth "bouncer" (P. T. Farnsworth, 1934, J. Franklin Inst. 218, 410–444) varying potentials are used to accelerate electrons in order to multiply them by secondary emission. There are three important advances features in a device according to the present invention. One is the possibility of bunching the photo-electrons so that even though they are emitted at random during the cycle of events they are bunched and move in the correct phase, synchronised with the varying fields, so that their velocity is increased by the time they strike the secondary emitting surface.

The second advantage is that the electrons are kept in focus by a focusing field. It is by this means that intensification of a complete image can be accomplished as distinguished from intensification of an element of a dissected image. Instead of controlling the intensification and preventing instability by allowing electrons to drift towards the sides of the tube as in the Farnsworth "bouncer," the loss of electrons from the system may be controlled by the potential of the electrodes, and the electrons which no longer take part in the multiplication process may be completely removed so that they cannot degrade other parts of the image.

The third novel advantage of the arrangement discussed below is that the focus of the secondary electrons can be made, to a first order, independent of their initial velocities of emission so that chromatic aberration is removed from the electron optical system. This is a very important point because the velocity of emission of secondary electrons is relatively high. In the Farnsworth "bouncer," in which electrons move from one secondary emitting electrode to another, chromatic aberration would rapidly destroy the image.

In the examples discussed below, a photo-cathode is used as the secondary emitting surface. This leads to simplicity in construction but is, however, not essential.

*Dynamic secondary emission image multipliers*

The principle will now be outlined with reference to the image converter tube shown in Figure 1.

In Figure 1, an image converter tube 1 has a photo-cathode 2 upon which an optical image is projected by a lens system 30, focused rays being indicated by the broken lines 40. Spaced from the photo-cathode 2 is a first wire mesh grid 3 and a second similar grid 4 in succession. At the end of the tube 1 remote from the photo-cathode 2 is arranged a fluorescent screen 5. Connections to the photo-cathode 2, grids 3 and 4 and screen 5 are brought out through the envelope of tube 1 to terminals 6, 7, 8 and 9 respectively. Terminal 6 is connected to line 10. A generator 11 of positive-going pulses is connected between line 10 and terminal 7 in the sense to make grid 3 more positive during the pulses. Terminal 8 is connected to a negative voltage source 12 and terminal 9 to a high positive potential source 13. The tube 1 is surrounded by a solenoid, not shown in the figure, producing a strong magnetic field in the direction of the arrow F to focus the electrons.

Figure 2A:
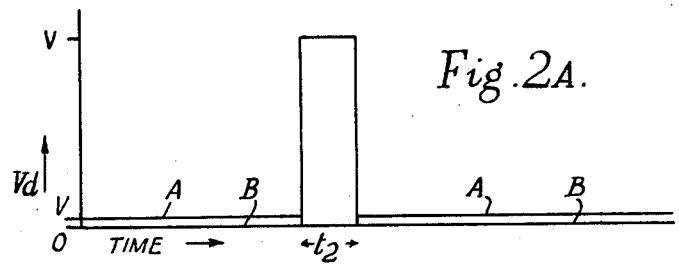
Figures 2A and 2B are time-voltage and time-electron displacement diagrams respectively relating to the operation of the invention.

Figure 2A shows the output of the pulse generator 11 with time and hence the potential ($V_d$) of the grid 3 with respect to the photo-cathode 2. Considering first the diagram A, it will be seen that the grid 3 has an initial low potential positive upon which a pulse having a duration ($t_2$) is superimposed.

Figure 2B:
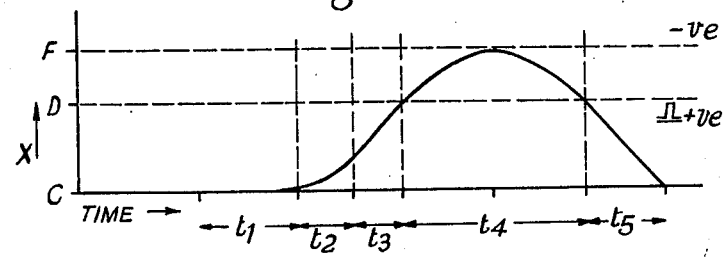

When a light image falls on the photo-cathode 2, electrons are emitted and drift slowly away from the photo-cathode 2 towards the grid 3. Before they have time to travel far, the positive pulse of voltage (V) is applied for a short time ($t_2$) to grid 3, so that the electrons are accelerated rapidly towards the grid 3. This action may be seen from the curve of Figure 2B which shows the displacement (X) with time of a sample electron or group of electrons from the surface of the photo-cathode 2. The axis C therefore represents the photo-cathode 2 while the lines D and F represent the positions of the grids 3 and 4 respectively. The drift towards grid 3 occurs during the time interval $t_1$ which extends from the time the electrons are emitted to the commencement of the pulse. Acceleration then occurs during the interval $t_2$, the duration of the pulse.

The pulse ends before the electrons have had time to reach the grid 3, but they continue towards it with a fairly high velocity during the interval $t_3$. Once they have passed through the grid 3 they are retarded by the field between grid 3 and grid 4, and eventually come to rest before reaching grid 4. The potential of grid 4 is made sufficiently negative to ensure this, allowance being made for the small initial velocity of emission of the photo-electrons. From the rest position, the electrons are accelerated back towards the grid 3, and finally pass through it again.

Passage through the grid 3 in the forward direction, reversal of the direction of motion of the electrons and passage through the grid 3 in the return direction occurs during the time interval $t_4$. The electrons continue to travel in the direction of the photo-cathode 2 which they strike, at the end of the further time interval $t_5$, with considerable velocity so that each primary electron liberates a number of secondary electrons.

The potentials applied to grids 3 and 4 ensure moreover that in the time interval $t_1$ to $t_5$ inclusive, each electron leaving the photo-cathode 2 performs substantially a complete circle, viewing its motion as projected in the plane of photo-cathode 2, so that it returns to its point of emission and the secondary electrons liberated therefore substantially reproduce the initial electron image.

The secondary electrons emitted in this way will be treated in a similar manner to the primary photo-electrons, with two important differences. The first difference arises from the fact that the secondary electrons are emitted with rather larger initial velocities than photo-electrons. The fast secondaries will travel further to the right in Figure 1 before they are brought to rest, and some may even penetrate the negatively charged grid 4. These latter electrons will then be accelerated towards the fluorescent screen 5 and will record their arrival by the emission of light. The slower secondaries will not be able to penetrate the grid 4 and will, like the photo-electrons, be returned to the photo-cathode 2 to produce further electrons by secondary emission. The proportion of secondaries which are allowed to penetrate the grid 4 can be controlled by adjustment of the potential of that grid.

The second important difference between the treatment of photo-electrons and the treatment of secondary electrons, is that the emission of secondaries is confined to one point of time in the cycle of events between one positive pulse on grid 3 and the next. Individual photo-electrons, may be emitted at any time during the cycle and may spend different lengths of time travelling from the photo-cathode 2 towards grid 4 and back to the photo-cathode 2. This difference in transit time will show up as an error in focus which, however, is not very serious if a strong magnetic field is employed, because the initial velocity of photo-electrons is relatively small. The fact that the secondaries are emitted at the same point in the cycle makes the transit time the same for all, so that this difficulty does not arise.

The great advantage of taking the secondary electrons out and back along the same path is that the transit time can be, to a first order, independent of the velocity of emission. Thus a fast moving electron spends a shorter time between photo-cathode 2 and grid 3, but spends longer between grids 3 and 4 and, by suitably spacing photo-cathode 2, grid 3 and grid 4, the difference may be balanced out to give a constant transit time. Thus "chromatic aberration" is absent in the focusing system, which is very important with secondary electrons having high initial velocities.

In an alternative mode of operation of the device, the grid 3 has no initial positive potential and its potential follows the diagram B of Figure 2A. In this case, the drift of photo-electrons towards the grid 3 during the whole of the interval between pulses does not take place because the photo-electrons tend to fall back onto the photo-cathode 2. Substantially only those emitted during the interval $t_2$ are drawn off and return to liberate secondaries. The initial electron image is correspondingly weaker but defocusing due to emission at different times is avoided.

With practical physical dimensions of the device of the order of centimetres and a pulse amplitude of a few hundred volts, the pulse duration is of the order of 10 milli-microseconds and the pulse repetition frequency 200 mc/s.

The use of sinusoidal potentials

Although possible, the generation of such short pulses at a high repetition frequency presents a practical difficulty and it is more convenient to use pulses of sinusoidal or decaying sinusoidal form.

To this end, the pulse generator 11 of the arrangement of Figure 1 may be replaced by an alternating voltage generator connected in series with a fixed voltage source of positive potential with respect to the photo-cathode 2. The fixed voltage is equal to or slightly greater than the peak alternating voltage so that the grid 3 never becomes negative with respect to the photo-cathode 2.

If a sinusoidal accelerating field is used, it must be arranged that the electrons enter the field when the phase is correct. A photo-electron arriving at the wrong point is liable to be returned to the photo-cathode with insufficient velocity to produce secondaries. To keep the proportion of these wasted electrons to a minimum, some method of "bunching" the electrons is required, so that those electrons which are emitted too early in the cycle are held back till the correct time arrives. It can be demonstrated or shown theoretically that by an appropriate combination of static and sinusoidal electric fields between the photo-cathode 2 and the grid 3, and between the grids 3 and 4, a fair degree of bunching and acceleration may be achieved. The field between the photo-cathode 2 and the grid 3 serves mainly to bunch the electrons as they are emitted from the photo-cathode, while the field between the grids 3 and 4 provides most of the acceleration. The efficiency of utilisation of photo-electrons can be made of the order of 75%.

Figure 3:
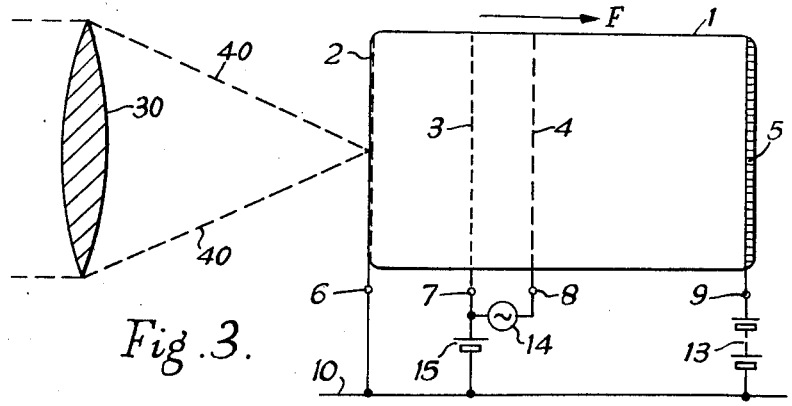
Figure 3 shows an image multiplier similar to that of Figure 1 but having its electrodes maintained at different potentials.

The device shown in Figure 3 is similar to that shown in Figure 1 except that the pulse generator 11 of Figure 1 is replaced by a voltage source 15 of fixed positive polarity with respect to the photo-cathode 2 and an alternating voltage generator 14 is connected between the grids 3 and 4 at terminals 7 and 8.

In a device of practical physical dimensions, the generator 14 provides a sinusoidal voltage of about 100 mc./s. and some hundreds of volts amplitude.

In operation, photo-electrons are emitted from the photo-cathode 2 and drift towards the grid 3. During the half cycle when the grid 4 is negative with respect to the grid 3, electrons passing the grid 3 are retarded and group in the vicinity of the grid 3. When the grid 4 becomes positive with respect to grid 3, they are accelerated forward subsequently to be arrested and returned through the grid 3 by reversal of the field during the following half cycle. The electrons are thereby returned to the photocathode 2 with considerably greater energy than on leaving. Each electron liberates a number of secondary electrons and the initial electron image is thereby reproduced at greater intensity.

The principle as applied to the intensification of charge images

The principle of dynamic secondary emission multiplication of charge images will be illustrated in relation to a television camera pick-up tube.

Figure 4:
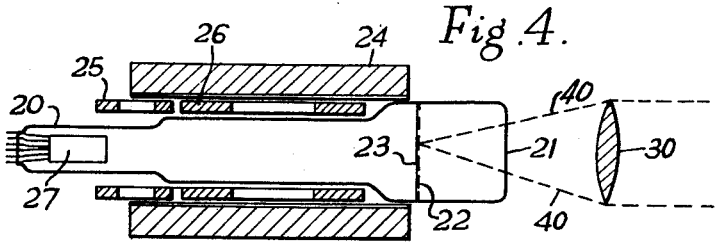
Figure 4 shows diagrammatically a television tube constructed according to known principles and Figure 5 shows the television tube of Figure 4 modified according to the present invention.

Charge storage has been used for many years in television pick-up tubes of various types. One form which a television tube making use of charge storage might take, is illustrated in Figure 4. As far as is known, no television pick-up tube has been built exactly like this, but all the principles involved have been embodied in actual television tubes before now.

In Figure 4, a television camera pick-up tube 20 has a cylindrical envelope of varying diameters along its length having a plane, transparent wall 21 at the end of greatest diameter. In this end section of the tube is mounted, at right angles to the axis, a thin charge storage plate 23. The conductivity across this plate is sufficiently high to allow electric charges to flow from one side to the other. On the side facing the wall 21 is deposited a mosaic photo-cathode 22. An optical image is focused on the surface of the photo-cathode 22 by a lens system 30, focused rays passing through the transparent end wall 21 being indicated by the broken lines 40.

At the opposite and smallest diameter end of the tube 20 is arranged an electron gun 27. Extending most of the axial length of the tube 20 between the gun 27 and charge storage plate 23 is a focusing coil 24 for producing a strong axial magnetic field. Between the coil 24 and the envelope of tube 20 are arranged alignment coils 25 and deflection coils 26 of which the horizontal alignment and horizontal deflection coils only are shown in the diagrammatic sectional view of Figure 4.

When light falls upon the photo-cathode 22, photo-electrons are emitted in number corresponding to the incident light intensity, thereby leaving on the photo-cathode 22 elemental positive charges forming a charge pattern corresponding to the optical image focused thereon. This charge pattern leaks through the charge storage plate 23 forming the corresponding charge pattern on the side facing the electron gun 27. By scanning the plate 23 with the electron beam produced by the gun 27, the charge pattern is read off by conventional television techniques. The scanning electron beam is focused by the coil 24. By cathode potential stabilisation, the photo-cathode is kept approximately at the potential of the cathode of the electron gun.

The purpose of describing this slightly unconventional, but perfectly practicable, television camera tube is to prepare the way for a description of a novel addition to the tube, which makes it possible to strengthen the charge image by dynamic secondary emission charge multiplication.

Figure 5:
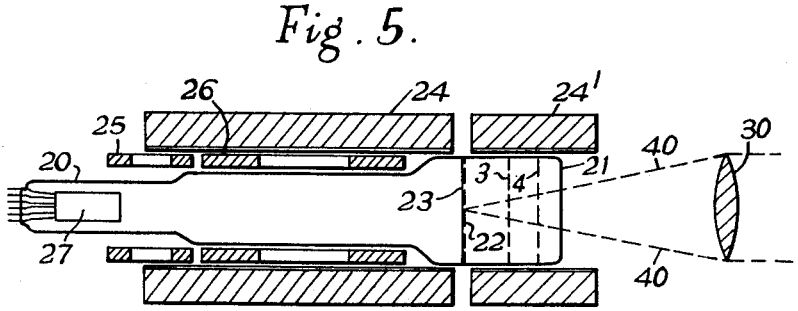

Such a modified television camera pick-up tube is shown at 20 in Figure 5, wherein parts corresponding to those of the tube 20 of Figure 4 are indicated by the same reference numerals. Two wire mesh grids 3 and 4 are mounted in spaced relationship to each other and the photo-cathode 22 between the photo-cathode 22 and the end wall 21. These grids are of sufficiently fine structure not to obscure the light rays focused on the photo-cathode 22. An extension 24' of the focusing coil 24 is provided extending over the region of the two grids 3 and 4.

The grids 3 and 4 in combination with the photocathode 22, form an electron optical device similar to those described with reference to Figures 1 and 3. Periodically varying potentials are applied to the electrodes in any of the manners described with reference to those figures. By this means, additional energy is imparted to the original photo-electron and to the subsequently liberated secondary electrons so that the original electron image is reproduced in intensified form. In consequence, elemental positive charges of greater magnitude forming an intensified charge pattern are left upon the photocathode 22. This intensified charge pattern is reproduced on the charge storage plate 23 and in the television signal produced by scanning the plate 23.

Control of the intensification of the charge pattern, that is the extent of liberation of secondaries, may be controlled by the potentials applied to the grids 3 and 4 and particularly to the grid 4 so as to control the proportion of electrons accelerated towards the grid 4 which are allowed to pass this grid. These electrons are not then accelerated to strike a fluorescent screen as in the examples of Figures 1 and 3 but are lost to the image intensifying system in exactly similar manner.

In the devices of Figure 1 and Figure 3, electrons which are permitted to escape from the image intensification system are used practically to create an intensified visual image on a fluorescent screen.

In an embodiment of the invention such as is described with reference to Figure 5, where the escape of electrons past the grid 4 serves no practical purpose than their removal from the system, it is convenient to use an alternative method of controlling the electron image intensification.

According to this method, build up of the electron image by successive liberation of secondary electrons is allowed to proceed for only a limited period. The intensifying action is then discontinued by temporary removal of the periodically varying potentials giving rise to the effect.

To this end, the periodically varying voltage generator used, whether pulse generator or sinusoidal voltage generator, comprises a continuous varying voltage generator and a modulation oscillator producing a wave of lower periodicity. The two outputs are applied to a modulator so that the output of the composite voltage generator comprises a continual succession of trains of pulses or waves.

The duration of the wave trains depends on the degree of image intensification required and the rate of intensification in any particular system. The interval between successive wave trains is of the order of a microsecond.

*Dynamic image intensifiers, image converters and image storage tubes*

It is well known that the detection of electrons is facilitated if the electrons can be accelerated to a suitable high velocity. For example, the electrons emitted from a photo-cathode when an optical image falls on it may readily be detected if they are accelerated on to a fluorescent screen. By focusing the electrons by means of electrostatic or magnetic fields, the configuration of the original optical image may be preserved on the fluorescent screen. This arrangement has been used as the basis of image intensifier and image converter tubes. Alternatively the arrival of the accelerated and focused electrons may be recorded by replacing the fluorescent screen by a charge storage plate or a photographic plate or any other plate sensitive to bombardment by electrons. These principles are embodied in some image recording tubes which have been made or proposed (McGee, J. Roy. Soc. Arts No. 4869, p. 329. Lallemand & Duchesne, Comptes Rendus 238, 335, 1954) and are also embodied in certain television camera tubes.

In some image intensifier, image converter and image recording tubes, and in certain television camera pickup tubes, high static potentials are required to accelerate the electrons to the velocity at which the sensitivity of detection is highest. For example, in a storage surface in which use is made of material showing the property of bombardment induced conductivity, the secondary charge which flows through the material and remains on the storage surface to mark the arrival of each primary bombarding electron, may be many times the electronic charge. This multiplication only occurs if the primary electrons have a velocity corresponding to many kilovolts static potential difference. A high electron velocity is also required in certain image intensifiers and image converters, particularly if a fluorescent screen with an aluminium backing is employed.

The use of high static potentials brings with it attendant disadvantages. In particular, positive ions accelerated by the static fields can directly or indirectly produce interfering signals or noise or an interfering background which may reduce the quality of an image or render the desired information less easily accessible or otherwise have a detrimental effect. These difficulties could be avoided by the use of varying potentials on suitably placed electrodes which, acting in a similar fashion to a linear accelerator or other particle accelerators would impart any required velocity or energy to the electrons.

It should be emphasised that the purpose of the varying potentials on the appropriate electrodes is to impart the required energy to certain electrons in the device. This is quite distinct from the variation of potential on the electrodes or image converters and similar devices with the aim of switching the device or part of the device on and off or with the aim of altering its sensitivity.

I claim:

1. An electron optical device comprising a photo electron and secondary electron emissive surface, means for causing an electron image to be emitted from said surface in response to radiant energy impinging thereupon, a first substantially planar electron-permeable non-secondary emissive electrode spaced from and substantially parallel to said surface, a second substantially planar electron-permeable non-secondary emissive electrode spaced from and substantially parallel to said first electrode, and spaced further from said surface than said first electrode, a first voltage source connected to said first electrode, a second voltage source connected to said second electrode, means for providing an electron focusing field substantially perpendicular to said surface, and a luminescent screen substantially parallel to said surface and spaced farther from said surface than said second electrode, said voltage sources being such that said second electrode is never at a negative potential with respect to said surface and the potential difference between said first and second electrodes varies periodically to cause photo electrons emitted from said surface to travel through said first electrode but not through said second electrode and to also cause said photo electrons to return through said first electrode to said surface so as to strike said surface and to liberate secondary electrons therefrom, said voltage sources causing said secondary electrons with sufficiently high velocity to travel through both said first and second electrodes and to impact said screen so as to substantially reproduce said electron image on said screen.

2. An electron optical device comprising a photo-cathode, means for causing an electron image to be emitted from said photo-cathode in response to radiant energy impinging thereupon, a first substantially planar electron-permeable non-secondary emissive electrode spaced from and substantially parallel to said photo-cathode, a second substantially planar electron-permeable non-secondary emissive electrode spaced from and substantially parallel to said first electrode, and spaced further from said photo-cathode than said first electrode, a first voltage source connected to said first electrode, a second voltage source connected to said second electrode, means for providing an electron focusing field substantially perpendicular to said photo-cathode, and a luminescent screen substantially parallel to said photo-cathode and spaced farther from said photo-cathode than said second electrode, said voltage sources being such that said second electrode is never at a negative potential with respect to said photo-cathode and the potential difference between said first and second electrodes varies periodically to cause photo electrons emitted from said photo-cathode to travel through said first electrode but not through said second electrode and to also cause said photo electrons to return through said first electrode to said photo-cathode so as to strike said surface and to liberate secondary electrons therefrom, said voltage sources causing said secondary electrons with sufficiently high velocity to travel through both said first and second electrodes and to impact said screen so as to substantially reproduce said electron image on said screen.

3. An electron optical device as claimed in claim 1, in which the first voltage source is a generator of positive-going pulses and the second electrode is maintained at a substantially fixed potential negative with respect to the said surface.

4. An electron optical device as claimed in claim 3, in which the pulses are positive-going from an initial voltage positive with respect to the said surface.

5. An electron optical device as claimed in claim 1, in which the first voltage source comprises an alternating voltage generator connected in series with a fixed voltage source of positive potential with respect to the said surface.

6. An electron optical device as claimed in claim 1, in which the first voltage source is of fixed positive polarity with respect to the said surface and an alternating voltage generator is connected between the first and second electrodes.

7. An electron optical device as claimed in claim 1, in which the second electrode is maintained at a fixed potential of such value that a proportion of the electrons passing the first electrode pass the second electrode also and are not returned to the said surface.

8. An electron optical device as claimed in claim 1, in which the periodic variation of the potential of the said voltage source is periodically discontinued so that further liberation of secondary electrons from the said surface periodically ceases.

9. An electron optical device as claimed in claim 2, in which the means for establishing an electron image at the said photo-cathode comprises a lens system.

10. An electron optical device as claimed in claim 7, having a fluorescent screen spaced from the second electrode and maintained at a potential positive with respect to the second electrode, whereby electrons passing the second electrode produce a visual image on the fluorescent screen substantially reproducing the said electron image.

11. An electron optical device as claimed in claim 2, having means for scanning the said electron image.

12. An electron optical device as claimed in claim 11, in which the photo-cathode is backed by a charge storage plate and the scanning means comprises an electron gun adapted to provide an electron beam and beam deflecting means for scanning the charge storage plate with the said electron beam.

References Cited in the file of this patent

UNITED STATES PATENTS

| | | |
|---|---|---|
| 2,107,782 | Farnsworth | Feb. 8, 1938 |
| 2,213,547 | Iams | Sept. 3, 1940 |

FOREIGN PATENTS

| | | |
|---|---|---|
| 866,777 | France | June 9, 1941 |

OTHER REFERENCES

Myers: Electron Optics, D. Van Nostrand Co., New York, 1949, pages 314 and 315.